(12) United States Patent
Aghukwa et al.

(10) Patent No.: US 12,674,589 B2
(45) Date of Patent: Jul. 7, 2026

(54) ENVIRONMENTALLY CONTROLLED CHAMBER SYSTEM UTILIZING HYDROCARBON REFRIGERANTS

(71) Applicant: STANDEX INTERNATIONAL CORPORATION, Salem, NH (US)

(72) Inventors: Bambie Chimankpa Aghukwa, Summerville, SC (US); Teddy Glen Bostic, Jr., Summerville, SC (US); David Michael Cottle, Ridgeville, SC (US); Ronald Wayne Jones, Summerville, SC (US); Jonathan Matthew Kolaski, Ridgeville, SC (US); John Lee Warder, Summerville, SC (US)

(73) Assignee: Standex International Corporation, Salem, NH (US)

( * ) Notice: Subject to any disclaimer, the term of this patent is extended or adjusted under 35 U.S.C. 154(b) by 529 days.

(21) Appl. No.: 17/196,350

(22) Filed: Mar. 9, 2021

(65) Prior Publication Data

US 2021/0285664 A1     Sep. 16, 2021

Related U.S. Application Data

(60) Provisional application No. 62/987,712, filed on Mar. 10, 2020.

(51) Int. Cl.
| | |
|---|---|
| *F24F 3/14* | (2006.01) |
| *C09K 5/04* | (2006.01) |
| *F24F 1/0059* | (2019.01) |

(52) U.S. Cl.
CPC .............. *F24F 3/14* (2013.01); *C09K 5/042* (2013.01); *C09K 5/045* (2013.01); *F24F 1/0059* (2013.01); *C09K 2205/12* (2013.01)

(58) Field of Classification Search
CPC .......... F24F 3/14; F24F 1/0059; C09K 5/042; C09K 5/045; C09K 2205/12
See application file for complete search history.

(56) References Cited

U.S. PATENT DOCUMENTS

| | | | | |
|---|---|---|---|---|
| 3,444,921 | A | * | 5/1969 | Frank, Jr. .................. F24F 3/14 165/263 |
| 11,273,230 | B1 | * | 3/2022 | Baumgartner ............ A61L 2/26 |

(Continued)

FOREIGN PATENT DOCUMENTS

| | | | | |
|---|---|---|---|---|
| JP | 2002267332 | A | * | 9/2002 |
| JP | 2013073502 | A | * | 4/2013 |
| JP | 2018077167 | A | * | 5/2018 |

OTHER PUBLICATIONS

Watabe (JP2013073502A), English Translation, Environment Testing Device, Apr. 22, 2013, Whole Document (Year: 2013).*

(Continued)

*Primary Examiner* — Jerry-Daryl Fletcher
*Assistant Examiner* — Keith Stanley Myers
(74) *Attorney, Agent, or Firm* — Saxton & Stump, LLC

(57) ABSTRACT

An environmentally controlled chamber system. The system includes an insulated enclosure having an access door and a humidification/dehumidification chamber enclosure arranged and disposed to provide humidification or dehumidification to the insulated enclosure. The system also includes a refrigerant loop having an enclosure evaporator, a dehumidification evaporator, at least one condenser, a variable speed compressor and piping for directing refrigerant from the variable speed compressor to the enclosure evaporator, the dehumidification evaporator, and the at least one condenser. An electrical heating element is arranged and disposed adjacent to the enclosure evaporator to selectively provide heat to at least a portion of the enclosure evaporator.

(Continued)

A method for controlling the environmentally controlled chamber system is also disclosed.

24 Claims, 7 Drawing Sheets

(56)                References Cited

U.S. PATENT DOCUMENTS

| | | | | |
|---|---|---|---|---|
| 2012/0244485 A1* | 9/2012 | Mikuski | ................. | F27B 17/00 |
| | | | | 432/92 |
| 2016/0178229 A1* | 6/2016 | Chen | ........................ | F24F 11/30 |
| | | | | 62/126 |
| 2018/0031294 A1* | 2/2018 | Olson, Jr. | ................. | F25C 5/10 |
| 2021/0071931 A1* | 3/2021 | Kim | ...................... | F25D 21/025 |

OTHER PUBLICATIONS

Kurayoshi (JP2018077167A), English Translation, Environmental Test Device and Air Conditioner, May 17, 2018, Whole Document (Year: 2018).*
Mehmet Kanoglu, External Flow: Drag and Lift, 2010, Hanbat National University, Whole Document (Year: 2010).*
Yamamoto et al. (JP2002267332A), English Translation, 2002, Whole Document (Year: 2002).*

* cited by examiner

ENVIRONMENTALLY CONTROLLED CHAMBER SYSTEM UTILIZING HYDROCARBON REFRIGERANTS

FIELD OF THE INVENTION

The present invention is directed to an environmentally controlled chamber system, such as an incubator or stability rate chamber, as well as other systems with chambers having controlled environments or testing systems for any number of products, pharmaceuticals and other materials in order to execute processes and characterize their behavior in extreme ambient environments and under rapidly changing ambient conditions including temperature, humidity and exposure to other gasses or chemicals for stability rate testing, incubation, warming, plant growth, and photostability, as well as other conditions.

BACKGROUND OF THE INVENTION

In standard stability rate chambers, incubators, warmers and plant growth cabinets it is common to use HFC refrigerants along with heating apparatus and proportional control of the gas states produced by the refrigeration vapor cycle (hot gas) for stabilizing and modulating the temperature and humidity of a test volume. The required proportional valving is expensive and complex to implement, control and has limited capability for rate change and temperature modulation. In addition, these types of systems have limited ability to operate at high humidity points at low temperatures due to the buildup of ice on the chamber evaporator. Most importantly, these types of systems require a considerable mass of refrigerant to operate and since they utilize HFC type refrigerants (such as R134a) they are also harmful to the environment since HFC refrigerants have been determined to have relatively high global warming potentials as compared to HC refrigerants.

Temperature stability, as utilized herein, is defined as the largest temperature difference experienced at a single point among all measured points in the refrigerated chamber over a period of time. Temperature uniformity, as utilized herein, is defined as the maximum variation of temperature experienced across all points in the refrigerated chamber at any single point in time during the testing period. There are a variety of additional technologies employing modulated temperature control methods, most notably thermoelectric (Peltier device) technologies. These types of systems may yield similar temperature stability but tend to be inefficient with energy utilization and unequal in energy distribution applied to the stabilization of chamber ambient conditions. In addition, these systems have limited temperature capability below ambient conditions due to the relatively inefficient cooling effect and the power and cost necessary to achieve refrigeration or freezer common temperature set points.

There is not found in the prior art a system or method for the utilization of the uniquely combined elements in combination with very limited refrigerant mass described herein to create a viable stability incubator rate chamber utilizing hydrocarbon refrigerants and proportional heating control of a duplicity of heating elements integrated around or within the evaporator. An incubator and stability rate chamber system that show one or more improvements in comparison to the prior art would be desirable in the art.

SUMMARY OF THE INVENTION

Embodiments of the present disclosure include an environmentally controlled chamber system, such as an incubator or stability rate chamber, as well as other systems with chambers having controlled environments or testing systems for any number of products, pharmaceuticals and other materials in order to execute processes and characterize their behavior in extreme ambient environments and under rapidly changing ambient conditions including temperature, humidity and exposure to other gasses or chemicals for stability rate testing, incubation, warming, plant growth, and photostability, as well as other conditions.

In an embodiment of the present disclosure, an environmentally controlled chamber system is provided. The system includes an insulated enclosure having an access door and a humidification/dehumidification chamber enclosure arranged and disposed to provide humidification or dehumidification to the insulated enclosure. The system also includes a refrigerant loop having an enclosure evaporator, a dehumidification evaporator, at least one condenser, a variable speed compressor and piping for directing refrigerant from the variable speed compressor to the enclosure evaporator, the dehumidification evaporator, and the at least one condenser. An electrical heating element is arranged and disposed adjacent to the enclosure evaporator to selectively provide heat to at least a portion of the enclosure evaporator.

In another embodiment of the present disclosure, a method of controlling an environmentally controlled chamber system is provided. The method includes providing an environmentally controlled chamber system having an insulated enclosure having an access door and a humidification/dehumidification chamber enclosure positioned outside of the insulated enclosure and arranged and disposed to provide humidification or dehumidification to the insulated enclosure. The system includes a refrigerant loop having an enclosure evaporator, a dehumidification evaporator, at least one condenser, at least one variable speed compressor and piping for directing refrigerant from the at least one variable speed compressor to the enclosure evaporator, the dehumidification evaporator, and the at least one condenser. An electrical heating element is arranged and disposed adjacent to the enclosure evaporator. Refrigerant is directed to a high-pressure differential between inlet and outlet and modulation of the refrigerant flow going to the dehumidification evaporator with one or more valves. In addition, heating at least a portion of the enclosure evaporator with the electrical heating element to prevent freezing and regulate the temperature of the humidification enclosure and insulated enclosure.

In another embodiment of the present disclosure, an electrical system for controlling an environmentally controlled chamber system is provided.

The disclosed method utilizes a variable cooling vapor cycle refrigeration system using a very small quantity of hydrocarbon refrigerant, for example, 150 grams or less, and strategically located integral heating elements to modulate the precise temperature of the conditioned air.

Alternatively, a more integrated heating element may be used consisting of an electrically resistive coating applied directly to the evaporator in part or in whole. In addition, this disclosure also describes this invention as it would pertain to systems using up to 500 g of HC refrigerant.

Also, integral to this system is a humidifying system utilizing the dynamic pressure and static pressure differentials to passively circulate air and utilize ultrasonic atomization of water to achieve vapor saturation within the humidifying apparatus and an evaporating coil for dehumidification.

Another aspect of the system to further improve conditioned air stability and uniformity are diffuser elements and air vane components designed to ensure conditioned air exiting the conditioning chamber has an extreme degree of temperature and humidity homogenization.

Yet another aspect of this invention is to utilize a heat spreader/diffuser to more evenly heat the air in the conditioned chamber resulting in high uniformity within the product chamber.

Still another aspect of this invention is the employment of an air distribution plenum utilizing a gradated vent pattern to proportionally control and equalize the airflow across the product area.

Additionally, an aspect of this invention is to operate with no more than 150 grams of HC refrigerant. Still another aspect of this invention is to operate with up to 500 grams of HC refrigerant.

Yet another aspect of this invention is to provide high and low temperature stability without the usage of hot gas blended with cold gas in the evaporator element as is required with HFC refrigerant systems commonly employing R134a or other HFC refrigerants or thermoelectric (Peltier device) systems.

Additionally, another aspect of this invention results in an extended operating envelope (temperature and humidity) due to the novel utilization and location of multiple heating elements and the ability to vary the refrigeration tonnage using variable frequency compressor technology.

Still another aspect of this invention is to selectively energize multiple heating elements to modulate temperature especially at low temperatures or high humidity levels without building up undesirable amounts of ice on the evaporator.

Still another aspect of this invention is to operate in systems utilizing gases in the product chamber such as $CO_2$, $O_2$, $N_2$ and others.

Still another aspect of the invention is to operate at high levels of humidity at freezing temperatures for extended periods of time.

Still another aspect of the invention is the precise control of the conditioned environment via PID control, are highly integrated control algorithms of the variable cooling, heating and humidity.

Yet another aspect of this invention is to utilize novel humidification controls and system logic for state selective pulsing of the ultrasonic humidifying elements to finely tune the humidity uniformity and stability within the chamber.

Additionally, another aspect of this invention is to utilize both the dehumidification evaporator independently or in conjunction with the chamber evaporator to create a system that can attain lower levels of humidity not typical of comparable systems and to dehumidify the chamber at much higher rates than comparable systems.

An additional aspect of this invention is to operate safely even in the event of a hydrocarbon gas leak due to the novel integration of a novel hydrocarbon detector for detecting hydrocarbon gas. This allows for the usage of some componentry that is not normally allowed in a system that could potentially leak hydrocarbon refrigerant. This allows for the usage of non-specialized, common and commodity level components at a lower cost and broader availability than rated components.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an environmentally controlled chamber system, according to the present disclosure, that operates with numerous advantages across multiple dimensions when compared to other incubator environmental control technologies due to the readily modulated simultaneous cooling and heating integration in addition to automatic frosting elimination during low temperature operation at high levels of humidity. The novel combination of related functionally interdependent system elements permits superior operation, as compared to known environmentally controlled chamber systems.

Embodiments of the present disclosure, for example, in comparison to concepts failing to include one or more of the features disclosed herein, provide refrigerated, heat and humidity stability control in environmentally controlled chamber systems that may be operated using very small amounts of refrigerants, including, for example, amounts of refrigerant of less than 500 g, compared to current designs utilizing HFC refrigerants. In addition, embodiments of the present disclosure include precisely controlled temperature and humidity environmentally controlled chamber systems, such as incubators, stability chambers, rate chambers, and test chambers. Further, embodiments of the present disclosure include enabling systems, subsystems, componentry, thermal phase change fluids, thermal modulation devices, controls, control algorithms and the novel integration of these systems to create said equipment and capabilities.

Figure 1:
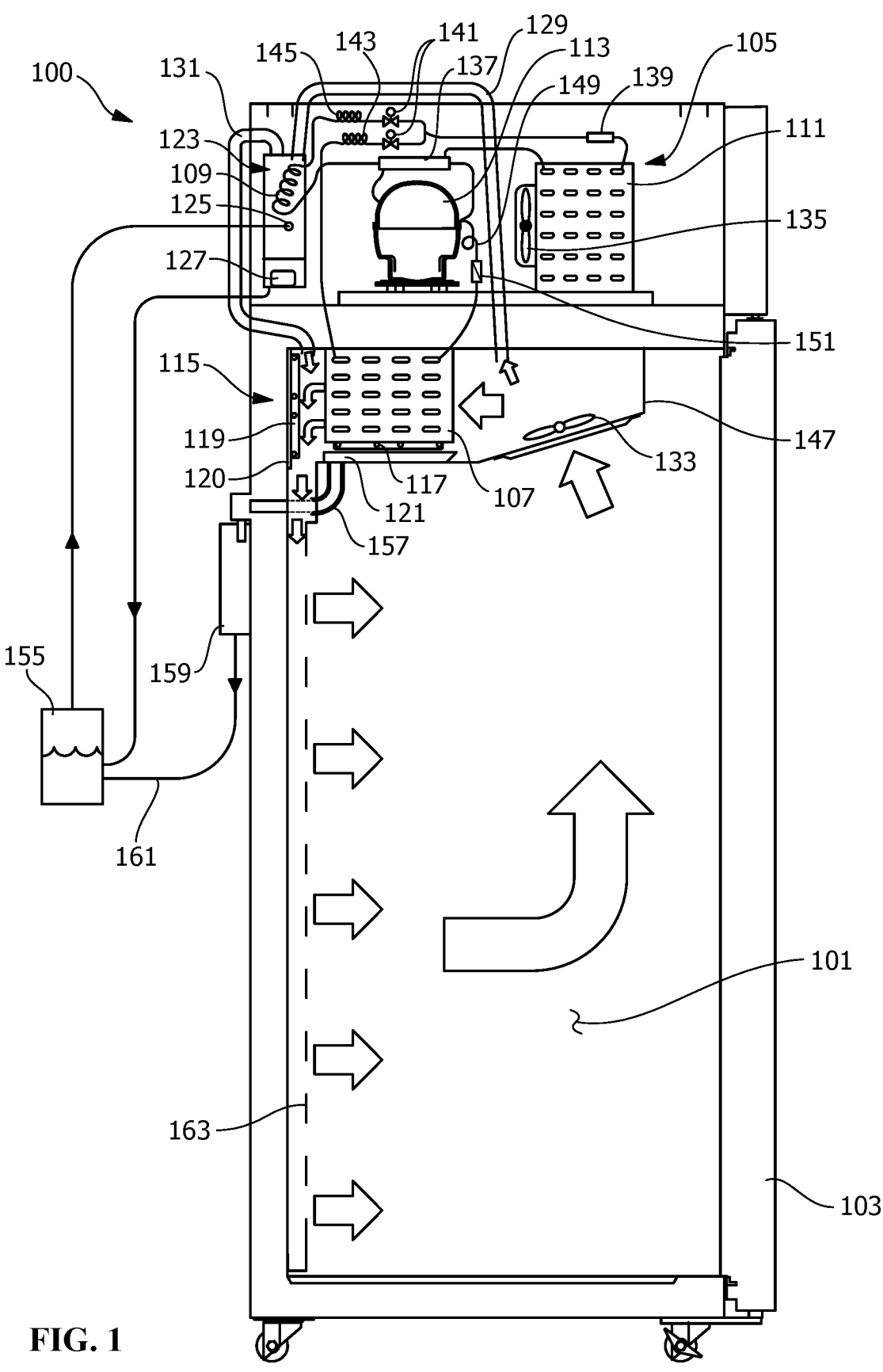
FIG. 1 is a schematic elevational view of an environmentally controlled chamber system, according to an embodiment of the present disclosure.
Figure 2:
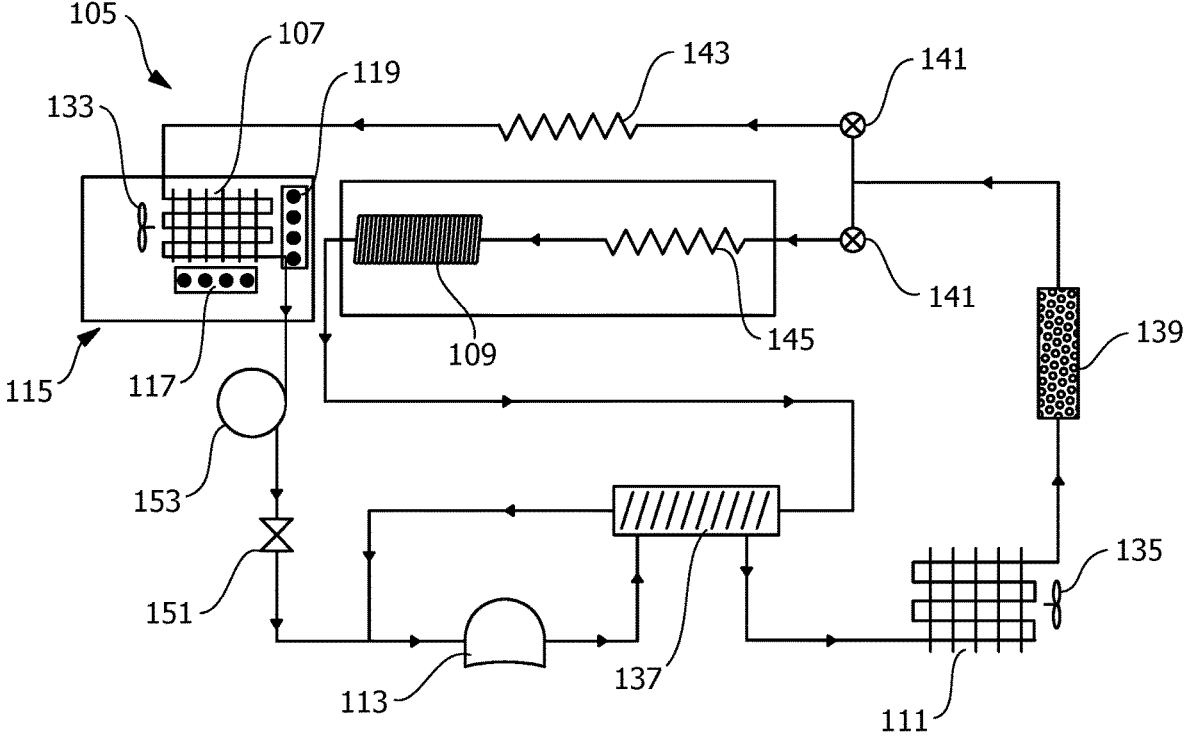
FIG. 2 is a schematic view of the thermal elements of the embodiment shown in FIG. 1.

FIG. 1 shows an environmentally controlled chamber system 100, according to an embodiment of the present disclosure. The environmentally controlled chamber system 100 includes an insulated enclosure 101 and an insulated or glass access door 103. The insulated enclosure 101 is a chamber or enclosure having a controlled atmosphere, including controlled temperature and humidity. Temperature and humidity control are provided at least in part by a refrigerant loop 105, as shown in FIG. 2. As shown in FIGS.

1 and 2, the refrigerant loop 105 includes an enclosure evaporator 107, a dehumidification evaporator 109, at least one condenser 111, a compressor 113 and piping for directing refrigerant from the compressor 113 to the enclosure evaporator 107, the dehumidification evaporator 109, and the at least one condenser 111. Condenser 111, enclosure evaporator 107, and dehumidification evaporator 109 may be any suitable configuration of heat exchanger, including, but not limited to, tube, plate, or fin-type heat exchanges. The compressor 113 may be a variable speed compressor capable of utilizing any number of hydrocarbon refrigerants, such as, but not limited to, R290 (i.e., propane), R600a (i.e., isobutane), mixtures, blends or hydrofluorocarbon (HFC)/ hydrocarbon (HC) hybrid refrigerants. The variable speed compressor 113 is used to modulate the refrigeration tonnage as required for the system operation. In one embodiment of the present disclosure, the refrigerant is a hydrocarbon refrigerant, wherein the total charge of the refrigerant is limited to small system charges. In one embodiment, the total system charge of refrigerant is less than 500 grams, less than 400 grams, less than 300 grams, less than 250 grams, less than 200 grams, less than 150 grams, or less than 100 grams.

Figure 4:
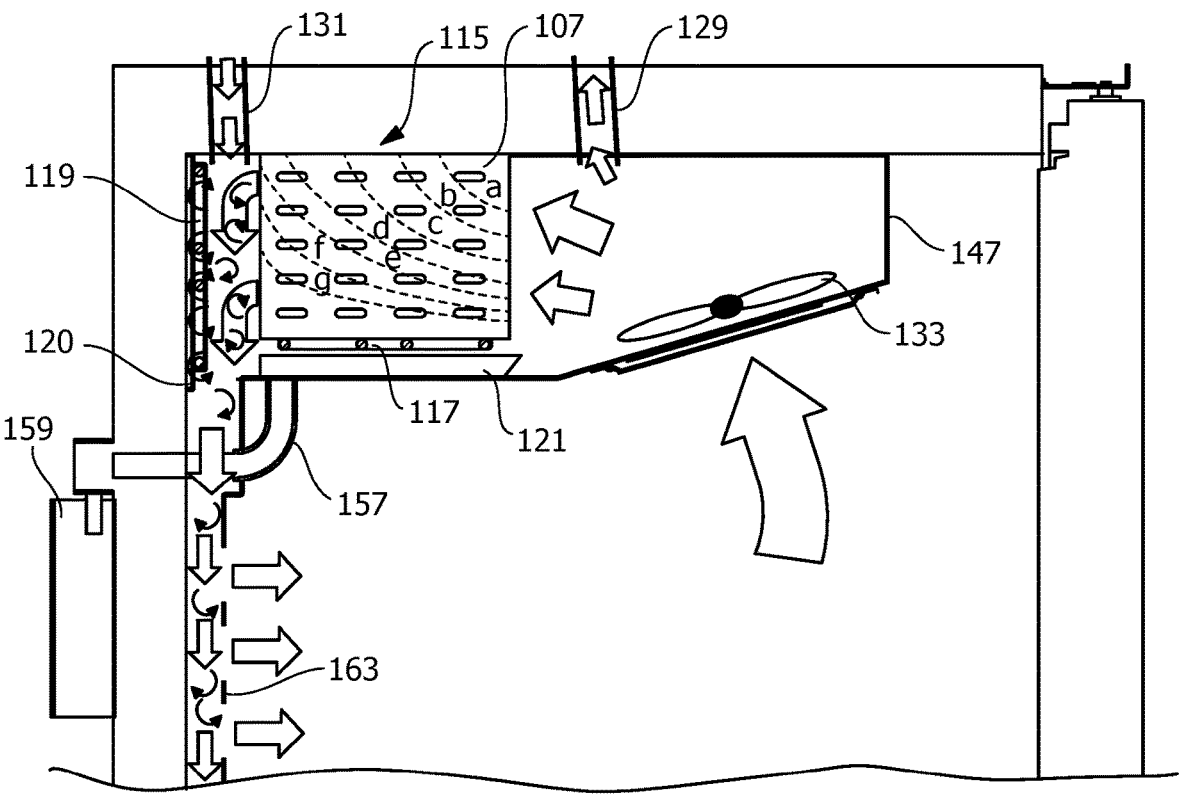
FIG. 4 is a schematic elevational view of an evaporator arrangement, according to another embodiment of the present disclosure.

As shown in FIGS. 1, 2 and 4, the environmentally controlled chamber system 100 includes a cooling/heating assembly 115 that includes enclosure evaporator 107 and a first electrical heating element 117 and a second heating element 119. In the embodiment shown in FIGS. 1, 2 and 4, first heating element 117 is positioned on the bottom of the enclosure evaporator 107 directly above the chamber evaporator condensate collection pan 121 along a bottom surface of the enclosure evaporator 107. The first heating element 117 is positioned in a location within the system 100 to have little or no exposure to the induced airflow allowing for heating, ice buildup control and dehumidification capability modulation. In addition to the first electrical heating element 117 above collection pan 121, a second heating element 119 is positioned parallel to a vertical surface of the enclosure evaporator 107 such that an induced airflow travels over the enclosure evaporator 107 prior to traveling over second heating element 119. The positioning of second heating element 119 is important to the total heating required for operation, ice buildup control and dehumidification using the enclosure evaporator 107 and air mixing to obtain temperature uniformity for the exhausted air. In addition, in the embodiment shown in FIG. 1, second heat element 119 is mounted or otherwise supported on a heat diffuser 120. System 100 has the capability to energize either of first heating element 117 or second heating element 119, individually or both the first heating element 117 and the second heating element 119 simultaneously. This is important to total heating required for operation, ice buildup control and dehumidification using the enclosure evaporator 107 and air mixing to obtain temperature uniformity for the exhausted air. This is also in contrast to current hydrofluorocarbon (HFC) systems that will utilize hot gas in the evaporator, a method that requires large amounts of refrigerant to execute. System 100 has the ability to modulate the total dissipated heat from either the first heating element 117 or the second heating element 119, individually or simultaneously via proportional voltage or amperage control in a preferred embodiment. A controller (see, for example, control 603 in FIG. 6) provides the ability to modulate the total dissipated heat from either first heating element 117 or second heating element 119 individually or simultaneously via proportional voltage or amperage control. As shown in FIG. 4, an icing onset gradient following the generalized curves demonstrated by lines "a" through "g". Icing begins at line "a" at an evaporator temperature of −4° C., 80% RH and a chamber temperature of 5° C. The icing gradient ends an evaporator temperature of −10° C., 95% RH and a chamber temperature of 5° C. Throughout the entire icing gradient ("a" through "g") the incubator system remains functionally viable due to the un-iced area of enclosure evaporator 107 maintained by first heating element 117 and second heating element 119.

In an alternate embodiment of the system 100, according to the present disclosure, the cooling/heating assembly 115 includes a heating element that passes through an interior portion of the enclosure evaporator 107. In this embodiment, the heating element may be either first heating element 117 or second heating element 119, or combination thereof, passing through an interior portion of the enclosure evaporator 107 to heat selected portions of the enclosure evaporator 107.

As shown in FIG. 1, the environmentally controlled chamber system 100 also includes a humidification/dehumidification chamber enclosure (HDCE 123) placed outside of the controlled chamber, within the ambient environment. HDCE 123 houses the componentry required for humidification, dehumidification including a water level sensing valve 125, a plurality of ultrasonic humidification elements 127, the dehumidification evaporator 109, and overflow drain and shut off valve. Air is supplied to HDCE 123 by the air inlet tube 129 and exhaust via the air outlet tube 131 that direct air through HDCE 123 and are placed in locations that permit the utilization of a pressure differential induced by the system evaporator fan (or fans) 133. For example, the placement of the air inlet tube 129 and air outlet tube 131 utilizes the pressure differential between the front and back of the enclosure evaporator 109 to induce an airflow through HDCE 123.

Figure 5:
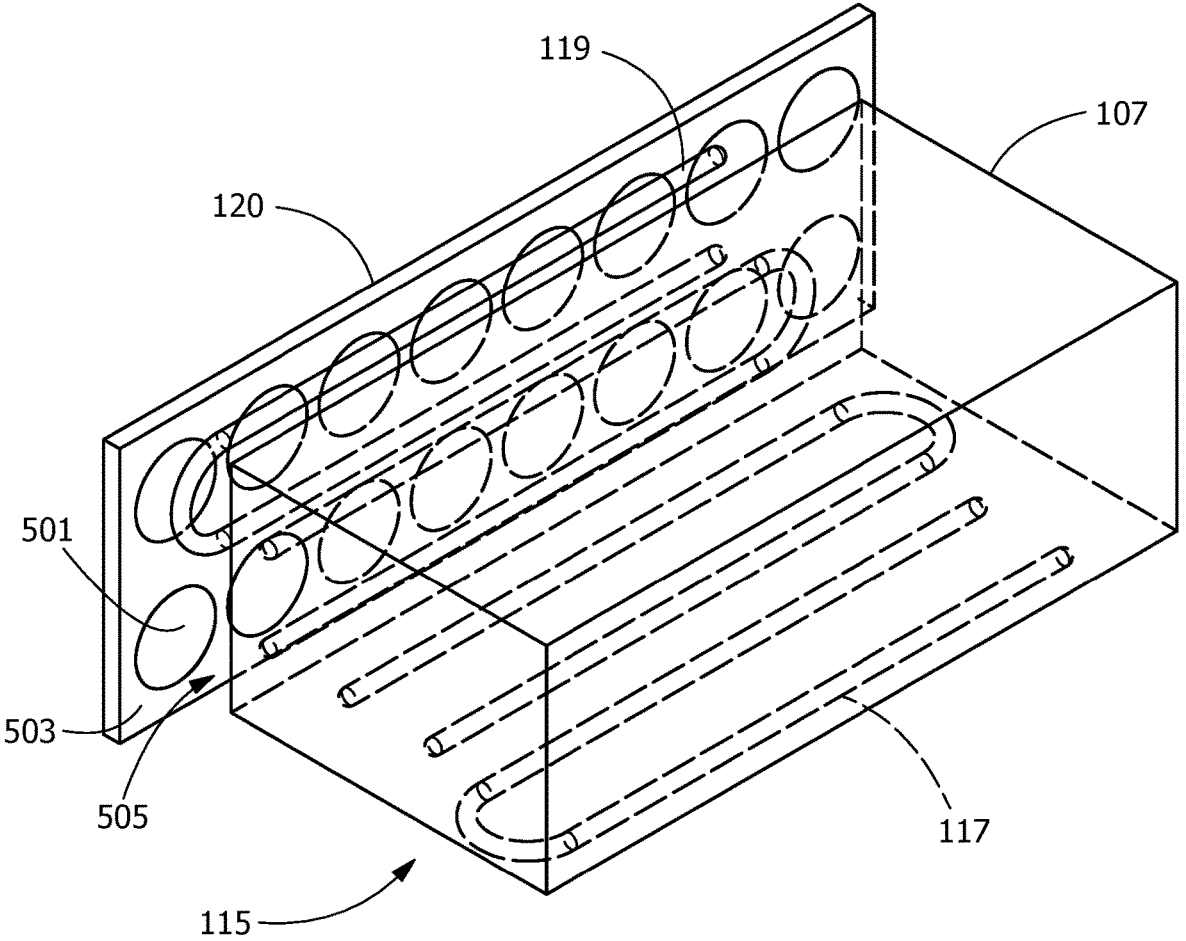
FIG. 5 is a schematic, perspective view of an evaporator arrangement, according to another embodiment of the present disclosure.

FIG. 5 shows the cooling/heating assembly 115 in a perspective view, including the enclosure evaporator and 107, the first heating element 117, the second heating element 119 and diffuser 120. As shown in FIG. 5, the diffuser 120 includes openings 501 along the surface 503 to which the second heating element 119 is mounted. In addition, the diffuser 120 includes air passage 505 that allows passage of air from the HDCE 123 (see, for example, FIG. 1) to permit enhanced dehumidification performance. The air passes through openings 501 and optional mixing vanes on the diffuser 120 (with or without the heating element 119 mounted to the diffuser 120) and plenum 163 causes the air mixing and heat spreading properties that allow the system 100, accordingly to the present disclosure, to work successfully and achieve acceptable to superior air properties required for the applications of this type of environmental controlled chamber system. Opening 501 includes circular patterns, but is not so limited, and may include other geometries.

As shown in FIGS. 1 and 2, the environmentally controlled chamber system 100 includes a condenser 111 for heat rejection into the ambient environment, a condenser fan 135 to circulate air over the condenser 111, an auxiliary heat exchanger 137 immediately downstream of the compressor 113 to provide de-superheating of the high side refrigerant and system durability, an in-line dryer element 139 for water removal. In order to selectively direct refrigerant through the system, two solenoid valves 141. In another embodiment of the disclosure, the system 100 may utilize a single three-way valve or any other valve arrangement in place of the two solenoid valves that is capable of selectively directing the refrigerant to either enclosure evaporator 107 or dehumidification evaporator 109. For example, refrigerant may be directed on a mass or volume basis percentage of amount of refrigerant to enclosure evaporator 107/dehumidification evaporator 109 ranging from 100%/0% to 0%/100%. Suitable alternative ratios include 100%/0%, 90%/10%, 80%/20%, 75%/25%, 70%/30%, 60%/40%, 50%/50%, 40%/60%, 30%/70%, 25%/75%, 20%/80%, 10%/90% or any other subrange between 0 and 100% apportioning to either the enclosure evaporator 107 or the dehumidification evaporator 109 as a function of the required system 100 operation.

In order to assist in achieving the desired temperatures for cooling and dehumidification, a first expansion device 143 and second expansion device 145 are present in the refrigerant loop 105 to provide refrigerant expansion prior to entering each of the enclosure evaporator 107 and the dehumidification evaporator 109 are incorporated. The first expansion device 143 is positioned in-line of the refrigerant loop 105 prior to entering the enclosure evaporator 107. The second expansion device 145 is positioned in-line of the refrigerant loop 105 prior to entering the dehumidification evaporator 109. The first expansion device 143 and second expansion device 145 may be small diameter capillary tubes, static setting valves, thermal expansion valves, electronic valves, or any combination of these elements for either circuit.

As shown in FIGS. 1 and 4, the enclosure evaporator 107 and other thermal elements are contained within an evaporator housing 147 within the enclosure 101 to enclose cooling/heating assembly 115, including the enclosure evaporator 107, first heating element 117 and second heating element 119. The enclosure evaporator 107 may be any suitable type of heat exchanger, such as a tube and fin heat exchanger utilized for heat absorption and secondary dehumidification within the controlled chamber. Evaporator fan 133 is arranged and disposed to circulate air over the enclosure evaporator 107, first heating element 117 and second heating element 119. Additionally, an enclosure evaporator service loop 149 in-line in the refrigerant loop 105 downstream from the enclosure evaporator 107 and positioned within the ambient air environment to provide superheating of the refrigerant prior to returning to the compressor 113 to ensure that little or no liquid refrigerant returns to the compressor 113.

Importantly, the inventive configuration of system 100 for the product type and required for the operation of such a system using very small amounts of refrigerant, a one-way valve 151 (check valve) after the enclosure evaporator service loop 149 to ensure unidirectional flow of returning refrigerant in the operational phase where refrigerant is directed to the dehumidification evaporator 109. The one-way valve 151 is a check valve or similar valve arrangement that permits the uni-directional flow of refrigerant. The uni-directional flow of refrigerant is important to the operation of system 100 as the uni-directional flow reduces or prevents liquid refrigerant from entering enclosure evaporator 107 when only dehumidification (without cooling) is desired.

Figure 3:
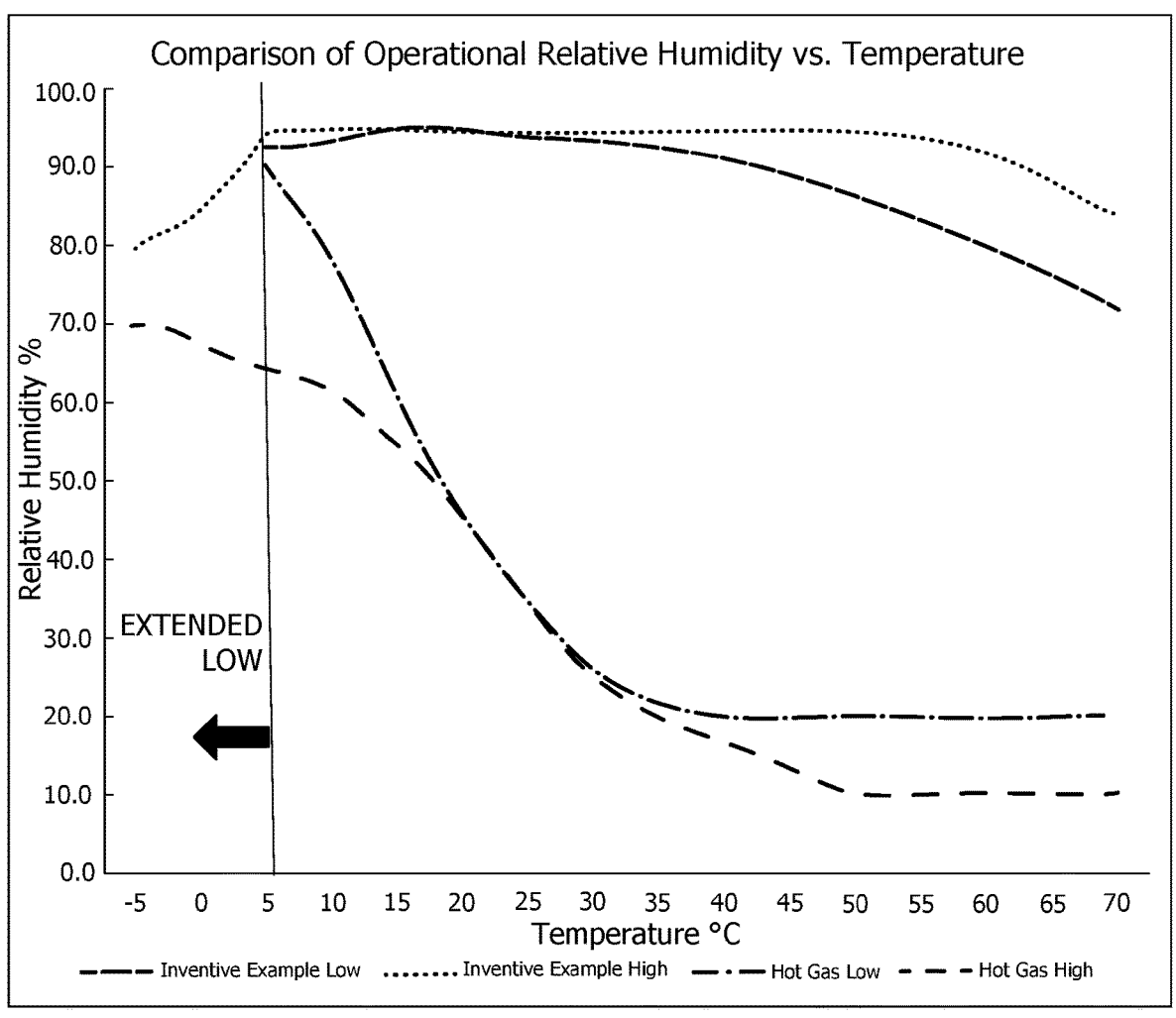
FIG. 3 is a graph of the operational envelope of an Inventive Example, according to an embodiment of the present disclosure, with respect to an operational envelope indicative of known controlled environment system utilizing hot gas heating of the evaporator.

The cooling/heating assembly 115 is capable of providing secondary dehumidification as necessary for additional dehumidification within the operational envelope. The secondary dehumidification achievable where the heating elements 117, 119 can balance the refrigeration effect of the enclosure evaporator 107. The additional dehumidification provided by the cooling/heating assembly 115 allows for much greater dehumidification capacity than a standard HFC system and an expansion of the typical operational envelope of known environmental chambers. FIG. 3, shows an exemplary operational envelope comparison of operation of system 100, according to an embodiment of the present disclosure, superimposed on an operational envelope indicative of known controlled environment systems utilizing hot gas heating. The Inventive Example shown in FIG. 3 is an arrangement according to the present disclosure, as shown and described with respect to FIG. 1. As shown in FIG. 3, the region between the Inventive Example Low and Hot Gas Low and between the Inventive Example High and Hot Gas High represents the extended capability of the Inventive Example as compared to the area between the Hot Gas Low and Hot Gas High, which is representative of typical current technology system utilizing HFC refrigerants and hot gas return mixing in the evaporator. In addition, the Inventive Example provides extended capabilities at temperatures below about 5° C. The performance of the Inventive Example is, at least in part, due to the ability for the system to providing an icing rate that is attenuated or eliminated at lower operating temperatures during high humidity operation via the implementation of multifunction heating element.

System 100 also includes an auxiliary heat exchanger 137 in the dehumidification path of refrigerant loop 105 downstream of the dehumidification evaporator 109. The auxiliary heat exchanger 137 provides superheating of the refrigerant prior to returning to the compressor 113 to ensure that liquid refrigerant does not return to the compressor 113.

An optional water supply and recycling system 155 that supplies water to the HDCE 123 for humidifying the enclosure 101. The evaporator condensate collection pan 121 collects and directs condensation from the enclosure evaporator 107 via a condensate supply tube 157 to the external condensate collection reservoir 159. A condensate return tube 161 that returns condensate from the collection reservoir to the water supply and recycling system 155.

System 100 also includes a plenum 163 with a multiplicity of slots, holes or other openings that manages the airflow induced by the evaporator fan 133 and directs it into the enclosure 101. This plenum provides further mixing of conditioned air (hot/cold, humid/dry) and allows air to enter the enclosure 101 in a distribution to improve conditioned air uniformity.

An environmentally controlled chamber system 100 may further include additional elements, such as, but not limited to, an insulated cabinet, insulated door, shelves, drawers, baskets, trays, plenum, mixer, directional control, variable speed compressor, integrated heating elements, applied resistive coating, logic controller, ultrasonic humidifier, dehumidification system, variable speed fans, chamber lighting, integrated touchscreen display, logic controller, hydrocarbon gas sensor, control relay electronics, proportional control electronics, voltage oscillator module, evaporator, condenser, expansion device, proportional valve, operational flow valves, canopy, casters, and legs.

Under the current regulations, the use of a hydrocarbon as a refrigerant precludes the use of any system or machinery inside a refrigerated cavity that may generate a spark. These regulations also prohibit the installation of power outlets inside the cavity that unknown items could be plugged into. The environmentally controlled chamber system 100, according to the present disclosure, utilizes a tested and recognized hydrocarbon detector assembly to achieve both the ability to produce refrigerated systems with power outlets inside the cavity and the ability to power all manners of machinery inside the cavity.

Figure 6:
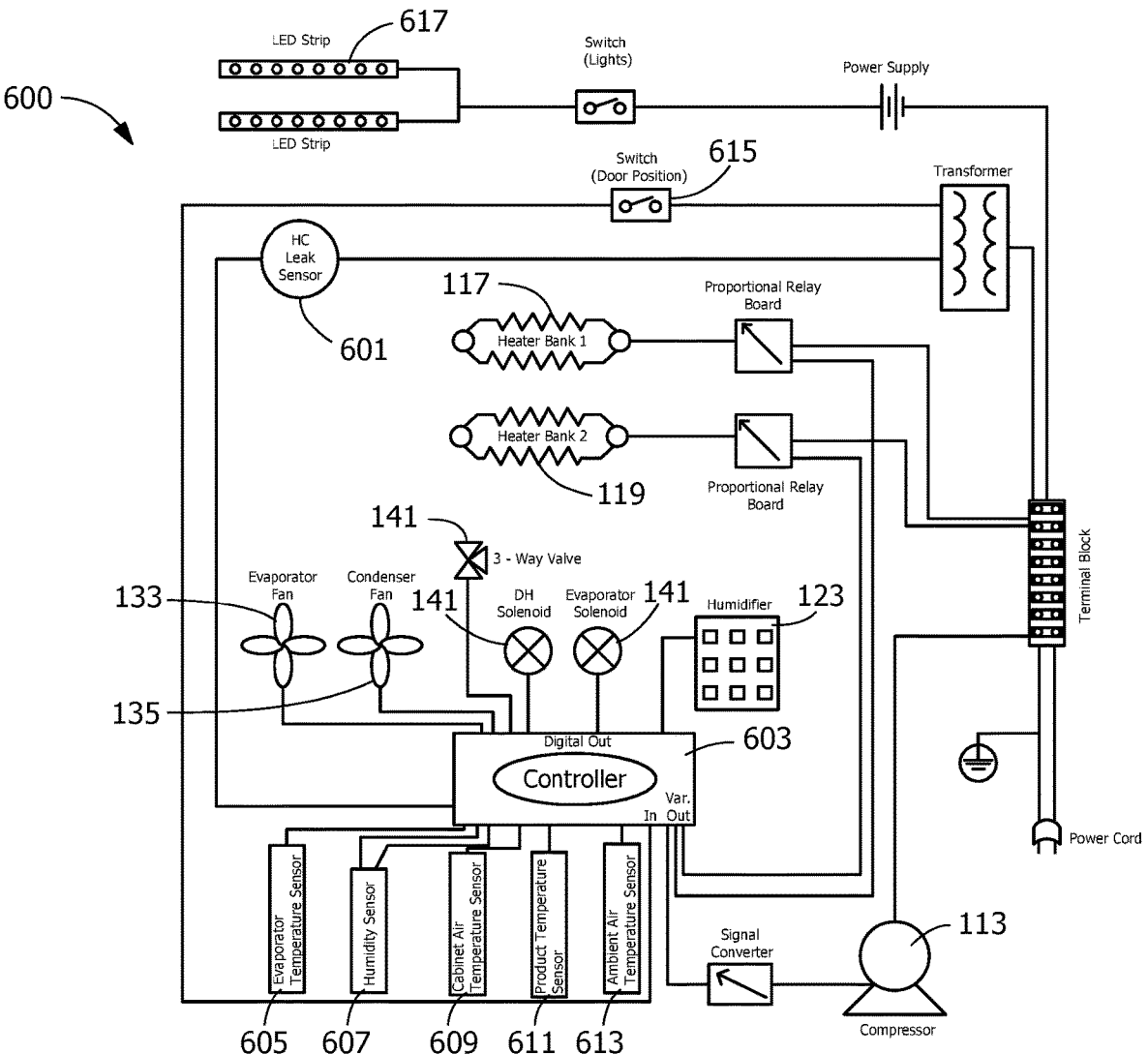
FIG. 6 is an electrical and control element diagram, according to another embodiment of the present disclosure.

FIG. 6 shows an electrical and control elements diagram, according to an embodiment of the present disclosure. In the embodiment shown in FIG. 6, the electrical system 600 includes a hydrocarbon detector 601, a controller 603, HDCE 123, first heating element 117, second heating element 119, evaporator fan 133, condenser fan 135, and solenoid valves 141. The hydrocarbon detector 601 will monitor the area around the controller 603 and any sparking components that have not been tested and approved for hydrocarbon refrigerant use. One advantage of the use of the hydrocarbon detector 601 is that this allows for use of components not rated for hydrocarbon refrigerants or for use in flammable environments. The electrical system 600 further includes a series of sensors including an evaporator temperature sensor 605, a humidity sensor 607, an enclosure air temperature sensor 609, a product temperature sensor 611 and an ambient temperature sensor 613 to provide temperature and humidity inputs to controller 603. Further, the electrical system 600 includes a door position switch 615 to provide controller a signal corresponding to the status of the access door 103 and LED lights 617 to provide lighting to the environmentally controlled chamber system 100.

The basic theory of operation for the hydrocarbon detector 601 in the electrical system 600 is to provide power to outlets inside the refrigerated cavity or devices in the vicinity of refrigeration components, monitor in real time for the presence of any hydrocarbon gas at the detector sensor and immediately shut power off to the outlets if the lower explosive limit is reached. The sensitivity and full operation of the detector 601 is hard wired-no software. The sensitivity is preferably set at a UL testing facility to verify and optimize design sensitivity. The detector 601 will sense a slow build up and trip at the lower explosive limit. The detector 601 will also sense a direct stream of hydrocarbon and trip immediately. The detector 601 will not respond to common cleaners and/or common solvents. This ensures no nuisance tripping. The detector 601 is designed with a hysteresis to prevent rapid cycling on and off. The electrical system 600 is designed with multiple safeguards to default to a safe (off) mode to prevent a scenario where there is no monitoring and power is still applied. The modular construction of the hydrocarbon detector 601 allows it to be used in multiple configurations. Use of the detector 601 inside the refrigerated cavity allows for employing a power outlet and any equipment the user requires. Use of the detector 601 on the outside of the refrigerated cavity allows for the use of electrical devices, such as controller 603, switches and sensors that are not tested and approved for use with hydrocarbon refrigerants. The hydrocarbon detector 601 can be detached from the portion of the assembly that controls the power so that the high voltage items can be safely installed where there is less risk of shock. The hydrocarbon detector will monitor the area around the controller 603 and any sparking components that have not been tested and approved for hydrocarbon refrigerant use. The placement of the detector 601 allows for use of less expensive, commodity and more highly available electrical components.

A PID type controller 603 is utilized employing sophisticated, novel algorithms to allow for incremental control of the humidity, heating and cooling. Important to the incremental control is the ability to modulate the output of multiple control lines to achieve proportional outputs that reduce the overall energy demand. The modulation allows for the cooling, heating and humidity to be balanced via proportional control that drives toward the minimal outputs necessary to achieve the desired results.

The algorithm for cooling is integrated with the algorithm for the humidification and dehumidification to adjust for optimal system function. The algorithm for the first heating element 117 and second heating element 119 is also integrated with the algorithm for the humidification and dehumidification for optimal results. This integration allows the unit to achieve humidity stability at limits both above and below any current units on the market. Integrating these systems also allows the use of high capacity elements to achieve extreme temperature and humidity states, but that operate at very low outputs to maintain steady state function Using these optimized subsystems equates to a lower overall power draw requirement to maintain a given setpoint.

The method according to the present disclosure includes an algorithm for cooling that is integrated with the algorithm for the humidification and dehumidification to adjust for optimal thermal performance. In addition, the method includes algorithms for the first heating element 117 and second heating element 119, which are integrated with the algorithm for the humidification and dehumidification for optimal results. This integration allows the unit to achieve humidity stability at limits both above and below any current units on the market.

In one embodiment, the system 100 includes a graphical user interface (GUI) on a backlit LCD controller integrated with control electronics in constituting a proportional integral and derivative (PID) capable controller 603 that serves as an entry device for parameters, equations and constants required for the operation of the system 100. The GUI on a remote LCD touchscreen display may be connected to the primary PID controller 603 integrated with control electronics that serves as an entry device for parameters, equations and constants required for the operation of the system 100. In another embodiment, the GUI is an intuitive digital interface that serves as a front end for interacting with the microcontroller PLC/PID system, displays read values from multiple analog and digital communication channels, displays system status, acquires and registers unit control parameters, and enables user input for parameter definitions and system configuration.

In one embodiment, the electrical system 600 includes humidity output. The humidity digital output 1) enables humidification, 2) verifies the air temp within the band no more than "x" degrees away from the temp setpoint, 3) controls the humidity to within the defined band from the humidity setpoint, 4) the temperature setpoint isn't above a threshold value that is deemed allowable as higher temperatures may compromise the integrity of the cabinet and 5) enables variable pulsed/timed energizing of the humidification elements (ultrasonic humidification elements) as is required for the given setpoints. In one embodiment, the electrical system 600 includes dehumidifier output. The dehumidifier output allows 1) user enabled dehumidification, 2) dehumidifier not in defrost mode, 3) verifies the air temp maintained within the band no more than "x" degrees away from the temp setpoint, 4) the relative humidity has climbed above the user-defined allowable upper threshold value, and 5) dehumidification will remain on as long as the humidity reading stays above the user-defined bottom threshold.

Variable speed proportional cooling may be provided by the control system, according to the present disclosure. Through a PID loop, an analog output signal is controlled that it is translated into a variable frequency input signal to the compressor via a voltage-frequency modulator. Different ranges of voltage input signals translate to different ranges of frequency input consequently regulating the compressor speed as required.

Heating control output may be provided by the control system, according to the present disclosure. Heating control output is provided through multiple, integrated PID loops, heating controls two sets of heaters (i.e., first heating element 117 and second heating element 119) (on the bottom and back of enclosure evaporator 107). The controller energizes these heaters to optimize the heating, humidification and dehumidification of the unit as is required for the given setpoints. In a novel way, the first heating element 117 and the second heating element 119 are selectively energized to strategically offset the cooling. This controlled electrical heating applied directly to the enclosure evaporator 107 at all temperature ranges is in contrast to the known method of utilizing hot gas within the evaporator coil to modulate enclosure 101 temperature. The energizing of the heating elements provides advantage over known systems in that the elements are energized to add heat and optimize the evaporator temperature in controlling the critical parameters (heating, cooling humidification and dehumidification) in order to most efficiently attain the system setpoints, optimize energy usage and extend the operational envelope using these strategies.

Operation of environmentally controlled chamber system 100 is segregated into three main temperature control ranges: Cooling, Ambient, and Heating. Temperature control is achieved by balancing the cooling effect of the refrigeration system with electric heat. Heating and cooling may be varied in different ways to achieve temperature stability. The environmentally controlled chamber system 100 includes control of a main cooling loop and a dehumidification loop, both tied to the single variable speed compressor. Two separate heater banks (i.e., first heater element 117 and second heater element 119), located below and behind the enclosure evaporator 107, receive independent proportional control signals that vary between full heat and no heat output.

Once temperature stability is achieved, the humidity control is enabled to allow for humidification or dehumidification as needed to maintain the desired humidity level. If measured air temperature within the chamber is not within "x" degrees of setpoint, humidity control is disabled until the temperature is restored to within range of setpoint. Humidification is achieved via ultrasonic pucks, controlled independent of the heating or cooling conditions.

Control within each temperature range depends on the state of dehumidification. The refrigeration system is modified to service both cooling and dehumidification, either independently or simultaneously. In one embodiment, cooling is activated via the cooling solenoid valve, which opens to allow refrigerant to flow to the enclosure evaporator 107. Dehumidification is activated via the dehumidification solenoid valve, which opens to send refrigerant to the dehumidification evaporator 109. When the compressor 113 is running, at least one solenoid must be open to allow a path for refrigerant to flow. The solenoids may be open simultaneously or switch back and forth to achieve the desired performance. In another embodiment, a proportional three-way valve is varied to balance refrigerant flow based on the demand for cooling and/or dehumidification.

In the cool temperature range during dehumidification, compressor speed increases proportional to the cooling demand and back heaters are utilized as primary temperature control to allow lower evaporator temperatures that aid in dehumidification. When not humidifying, compressor speed is minimized to the lowest speed needed to maintain temperature with all heaters active. In the ambient temperature range, cooling function is primarily from the dehumidification evaporator with back and bottom heaters only provided minimal inputs to moderate temperature.

Main evaporator remains unused but may be pulsed on momentarily if additional cooling is needed. In the high temperature range, compressor only runs to provide refrigerant to the dehumidification coil. Compressor and main evaporator may be pulsed if significant cooling is required, otherwise cooling is unused. Both bottom and back heaters are used to regulate temperature via PID control.

The environmentally controlled chamber system 100, according to the present disclosure, permits temperature uniformity at any moment during steady state operation. In one embodiment, the temperature is readily maintained to a uniformity of 1.0° C. within enclosure 101 In addition, in one embodiment, system 100 provides temperature stability of 0.5° C. at a single point within enclosure 101 over time. In addition, in one embodiment, system 100 provides humidity stability of ±1.0 to 3.0% RH, depending on setpoint, at a single location within enclosure 101 over time. In addition, embodiments of the present disclosure include extended operational range vs. known technologies utilizing HFC refrigerants and hot gas mixing used for temperature stabilization. In one embodiment, the range of operation extends up to 10° C. below the typical lowest practical operating temperature of known systems. The extended range is due to the ability to utilize the enclosure evaporator 107 as a dehumidification element at evaporator temperatures well below freezing. The onset of evaporator icing is delayed by the activation of first heating element 117 and second heating element 119. Temperature is maintained due to the system's ability to proportionately increase the refrigeration tonnage via the variable frequency compressor.

Environmentally controlled chamber system 100 achieves the improved temperature and humidity control by the positioning of the first heating element 117 and the second heating element 119 to allow for superior temperature modulation while the enclosure evaporator 107 is under full refrigeration without requiring the use of hot gas return modulation. The placement of the first heating element 117 counteracts the heavy condensation on the evaporator element which must continually operate with cold refrigerant. The method, according to the present disclosure, allows for operation without hot gas being added to the enclosure evaporator feed, which is done in similar systems using larger (greater than 150 g) refrigeration charges. In other embodiments, the same configuration may be used with a larger mass of refrigerant (up to 500 g) where hot gas mixing in the evaporator may still not be viable due to the relatively small amount of refrigerant. Usage of a plurality of heating elements (either or both), according to the present disclosure, allows for direct application of heat to the evaporator or not due to the airflow direction. In the "no direct heat" application mode, the enclosure evaporator 107 may be used as a high effectiveness humidity removal element expanding the operational envelope of the unit relative to competitive systems. The temperature of the air exiting the cooling/heating assembly 115 and plenum 163 has superior uniformity compared to known environmental control systems (uniformity of ±0.5° C. exiting plenum) due to the air mixing and heat spreading properties of the diffuser element 120.

Figure 7:
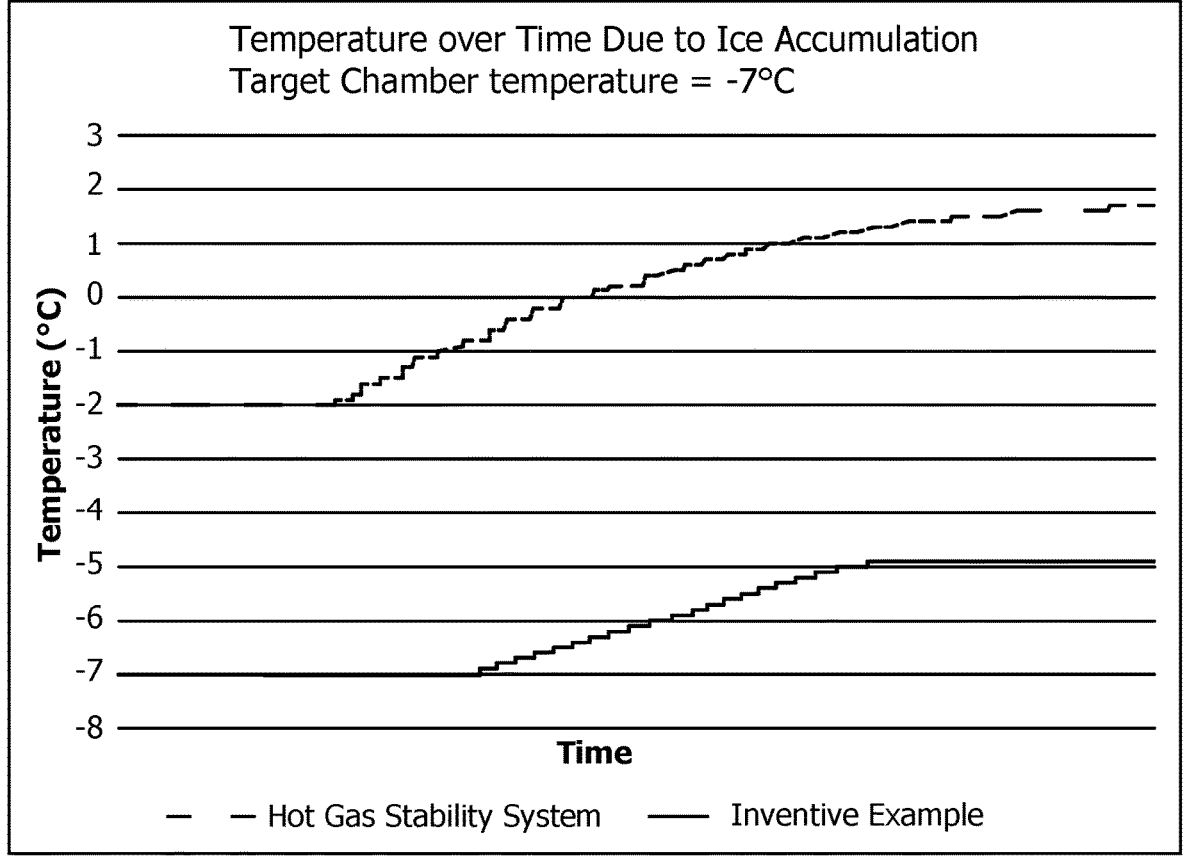
FIG. 7 is a graph of temperature over time due to ice accumulation showing an Inventive Example according to an embodiment of the present disclosure with respect to a known controlled environment system utilizing hot gas heating of the evaporator.

FIG. 7 shows a graph demonstrating the performance of an Inventive Example, which is a system according to the system shown and described with respect to FIG. 1, in comparison to a Hot Gas Stability System, which is a known system that utilizes hot gas return mixing in the evaporator. The graph shown in FIG. 7 is a graph of the temperature over time due to ice accumulation showing an inventive example according to an embodiment of the present disclosure with respect to a known controlled environment system utilizing hot gas heating. As shown in FIG. 7, significantly lower temperature operation and greater temperature stability is achieved due to the utilization of system 100 according to the present disclosure.

In one embodiment, the hydrocarbon detector is employed in a novel way not previously seen in any product or existing art to allow for the inclusion of non-compliant componentry due to the requirements of current regulations. The use of a hydrocarbon as a refrigerant precludes the use of any system or machinery inside the refrigerated cavity that may generate a spark. These regulations also prohibit the installation of power outlets inside the cavity that unknown items could be plugged into. To this end, we have developed and are utilizing a tested and recognized hydrocarbon detector assembly to achieve both the ability to produce refrigerated systems with power outlets inside the cavity and the ability to power all manners of machinery inside the cavity. The sensor on the detector can be detached from the portion of the assembly that controls the power so that the high voltage items can be safely installed where there is less risk of shock.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. An environmentally controlled chamber system comprising:
  an insulated enclosure having an access door;
  a humidification/dehumidification chamber enclosure arranged and disposed to provide humidification or dehumidification to the insulated enclosure;
  a refrigerant loop comprising:
    an enclosure evaporator, a dehumidification evaporator, at least one condenser, a variable speed compressor, a controller, and piping for directing refrigerant from the variable speed compressor to the enclosure evaporator, the dehumidification evaporator, and the at least one condenser; and
    an electrical heating element having a first electrical heating element positioned on the bottom and in contact with the enclosure evaporator, the first electrical heating element being arranged and disposed adjacent to the enclosure evaporator with little or no exposure to an induced airflow to selectively provide heat to at least a portion of the enclosure evaporator and a second electrical heating element positioned such that the induced airflow goes over the enclosure evaporator prior to going over the second heating element;
    wherein the controller is configured to energize one or both of the first electrical heating element and the second electrical heating element to offset cooling of the enclosure evaporator during operation of the variable speed compressor.

2. The system of claim 1, wherein the refrigerant is a hydrocarbon refrigerant.

3. The system of claim 2, wherein the hydrocarbon refrigerant is selected from the group consisting of R290 or R600a, hydrofluorocarbon/hydrocarbon hybrid refrigerants and combinations thereof.

4. The system of claim 2, wherein the refrigerant loop contains less than 500 g of refrigerant.

5. The system of claim 2, wherein the refrigerant loop contains less than 150 g of refrigerant.

6. The system of claim 2, wherein the first electrical heating element is positioned above a condensate pan.

7. The system of claim 1, wherein the second heating element is mounted on a diffuser.

8. The system of claim 2, wherein the first electrical heating element passes through an interior portion of the enclosure evaporator.

9. The system of claim 7, wherein the diffuser is arranged and disposed to permit flow of air therethrough.

10. The system of claim 1, wherein the humidification/dehumidification chamber enclosure is positioned outside of the insulated enclosure and is arranged with componentry capable of providing humidification and dehumidification, the componentry including a water level sensing valve, a multiplicity of ultrasonic humidification elements, and the dehumidification evaporator.

11. The system of claim 2, further comprising an air inlet tube and an air outlet tube to direct air through the humidification/dehumidification chamber enclosure, wherein the placement of the air inlet tube and the air outlet tube utilizes a pressure differential between the air inlet side and air outlet side of the enclosure evaporator to induce the induced airflow through the humidification/dehumidification chamber enclosure.

12. The system of claim 2, further comprising a condensate loop downstream from the variable speed compressor to provide de-superheat, system durability and condensate control.

13. The system of claim 2, further comprising a hydrocarbon sensor arranged and disposed to detect hydrocarbon leaks from the refrigerant loop.

14. A method of controlling an environmentally controlled chamber system comprising:
  providing an environmentally controlled chamber system comprising:
    insulated enclosure having an access door;
    a humidification/dehumidification chamber enclosure positioned outside of the insulated enclosure and arranged and disposed to provide humidification or dehumidification to the insulated enclosure;
    a refrigerant loop comprising:
    an enclosure evaporator, a dehumidification evaporator, at least one condenser, at least one variable speed compressor and piping for directing refrigerant from the at least one variable speed compressor to the enclosure evaporator, the dehumidification evaporator, and the at least one condenser; and
    an electrical heating element having a first electrical heating element positioned on the bottom and in contact with the enclosure evaporator, the first electrical heating element being arranged and disposed adjacent to the enclosure evaporator, the first electrical heating element having little or no exposure to an induced airflow and a second electrical heating element positioned such that the induced airflow goes over the enclosure evaporator prior to going over the second heating element;

directing the refrigerant to a high-pressure differential between inlet and outlet and modulation of the refrigerant flow going to the dehumidification evaporator or the dehumidification evaporator with one or more valves; and heating at least a portion of the enclosure evaporator by energizing one or both of the first electrical heating element and the second electrical heating element to offset cooling of the enclosure evaporator during operation of the variable speed compressor.

15. The method of claim 14, wherein the heating of at least a portion of the enclosure evaporator with the electrical heating element includes selective heating of the first heating element and the second heating element.

16. The method of claim 15, wherein the heating of at least a portion of the enclosure evaporator with the electrical heating element includes heating of the first heating element and the second heating element individually or simultaneously via proportional voltage or amperage control.

17. The method of claim 15, further dehumidifying air for the enclosure with the enclosure evaporator while providing controlled heating to the enclosure evaporator with the first heating element and the second heating element.

18. The method of claim 14, wherein the refrigerant is a hydrocarbon refrigerant.

19. The method of claim 18, wherein the hydrocarbon refrigerant is selected from the group consisting of R290 or R600a, hydrofluorocarbon/hydrocarbon hybrid refrigerants and combinations thereof.

20. The method of claim 18, wherein the refrigerant loop contains less than 500 g of refrigerant.

21. The method of claim 18, wherein the refrigerant loop contains less than 150 g of refrigerant.

22. The method of claim 14, wherein the heating of the at least a portion of the enclosure evaporator is devoid of hot gas heating.

23. The method of claim 14, wherein the temperature of the enclosure is maintained to ±0.5° C. of air exiting a plenum and within the enclosure.

24. The method of claim 14, wherein the humidity of the enclosure is maintained within ±1.0% to 3.0% relative humidity, depending on setpoint, within the enclosure.

* * * * *